United States Patent
Jeong (10) Patent No.: US 7,298,609 B2
(45) Date of Patent: Nov. 20, 2007

(54) COMPUTER (75) Inventor: Kyu-yeob Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 221 days.

(21) Appl. No.: 10/822,684

(22) Filed: Apr. 13, 2004

(65) Prior Publication Data

US 2004/0257754 A1    Dec. 23, 2004

(30) Foreign Application Priority Data

Jun. 23, 2003   (KR)   ................... 10-2003-0040850

(51) Int. Cl.
*H05K 7/00* (2006.01)

(52) U.S. Cl. .................. 361/683; 361/801; 361/802; 361/726; 361/727

(58) Field of Classification Search ............. 361/756, 361/759, 801, 802, 807, 809, 740, 741, 798, 361/683

See application file for complete search history.

(56) References Cited

U.S. PATENT DOCUMENTS

| | | | | |
|---|---|---|---|---|
| 5,317,483 | A * | 5/1994 | Swindler | ................. 361/801 |
| 5,452,184 | A * | 9/1995 | Scholder et al. | ............ 361/799 |
| 5,457,608 | A * | 10/1995 | Scholder et al. | ............ 361/752 |
| 6,023,415 | A | 2/2000 | Mayer et al. | |
| 6,088,232 | A | 7/2000 | Ho | |
| 6,113,402 | A | 9/2000 | Joo | |
| 6,385,051 | B1 * | 5/2002 | Perez et al. | .............. 361/759 |
| 6,424,540 | B1 * | 7/2002 | Chen et al. | ............... 361/759 |
| 6,813,161 | B2 * | 11/2004 | Le et al. | ................... 361/758 |
| 6,813,165 | B2 * | 11/2004 | Cheng et al. | ............ 361/801 |
| 6,870,731 | B2 * | 3/2005 | Lin et al. | ................... 361/683 |
| 2002/0075638 | A1 * | 6/2002 | Chen | ........................ 361/683 |

FOREIGN PATENT DOCUMENTS

| | | |
|---|---|---|
| JP | 64-33791 | 3/1989 |
| JP | 7-106778 | 4/1995 |
| JP | 3076911 | 1/2001 |
| KR | 98-4735 | 3/1998 |
| KR | 20-164603 | 10/1999 |

* cited by examiner

*Primary Examiner*—Lisa Lea-Edmonds
*Assistant Examiner*—Ingrid Wright
(74) *Attorney, Agent, or Firm*—Staas & Halsey LLP (57) ABSTRACT

A computer comprising a casing forming an outer appearance and having a main board attaching surface to which a main board is attached, further comprises a main board supporting unit provided on the main board attaching surface so as to support the main board, the main board supporting unit comprising a holder having a locking part, slidably combined to the main board attaching surface, and preventing the main board attached onto the main board attaching surface from moving; and a guiding part formed on the main board attaching surface at a position spaced from the main board so as to guide the holder, the locking part being locked to the guiding part. With this configuration, the present invention provides a computer, in which a main board is easily attached to and detached from a casing, so that time taken to assemble the computer is reduced and therefore the computer is improved in its productivity, components are prevented from damage which may occur while the main board is attached to or detached from the casing, and various sizes of the main board can be firmly attached to the casing.

29 Claims, 9 Drawing Sheets

COMPUTER

CROSS-REFERENCE TO RELATED APPLICATIONS

This application claims the benefit of Korean Patent Application No. 2003-40850, filed Jun. 23, 2003, in the Korean Intellectual Property Office, the disclosure of which is incorporated herein by reference.

BACKGROUND OF THE INVENTION

1. Field of the Invention

The present invention relates to a computer, and more particularly, to a computer in which a main board is easily attached and detached.

2. Description of the Related Art

Generally, a computer includes a box shaped casing formed with at least one opening side, and a casing cover to cover the opening of the casing.

A hard disk drive, a floppy disk drive, a CD-ROM (compact disc—read only memory) drive, etc., are disposed in a front of the casing. A main board mounted with a CPU (central processing unit), a RAM (random access memory), and an expansion card such as a graphic card, a sound card, etc. are disposed on an inside wall of the casing.

Such a main board can be attached onto the inside wall of the casing with various devices. For example, there is a main board supporting device disclosed in Korean Utility Model First Publication No.1998-4735, wherein the main board supporting device comprises a supporting projection protruding from a casing, a bracket to support a main board supported by the supporting projection, an elastic member allowing the bracket to slide elastically, and a guide part to guide the bracket elastically sliding by the elastic member.

However, a main board supporting device having a structure simpler than the conventional main board supporting device, allows a user to more easily attach the main board to and detach the main board from the casing. Further, from a manufacturer's point of view, time taken to assemble the computer is reduced and therefore the computer is improved in its productivity.

Further, if a position of the main board supporting device varies according to sizes of the main board, a user can conveniently replace the main board with another one regardless of the sizes of the main board.

SUMMARY OF THE INVENTION

Accordingly, it is an aspect of the present invention to provide a computer in which a main board is easily attached and detached.

The foregoing and/or other aspects of the present invention are achieved by providing a computer comprising a casing forming an outer appearance and having a main board attaching surface to which a main board is attached, and further comprising a main board support provided on the main board attaching surface to support the main board, the main board support comprising a holder having a lock, slidably combined to the main board attaching surface, and preventing the main board, which is attached onto the main board attaching surface, from moving; and a guide formed on the main board attaching surface at a position spaced from the main board to guide the holder, the lock being locked to the guide.

According to another aspect of the invention, the holder comprises a main body having the locks respectively formed in opposite sides thereof; a first grip upwardly extended from each lock and allowing the pair of locks to move toward and away from each other; a holder provided at an end of the main body between the pair of first grips to support one edge of the main board; a second grip protruding from an upper surface of the main body at a position opposite to the holder and pushing the main body to slide; and an elongated guide hole formed on the main body between the holder and the second grip.

According to another aspect of the invention, the guide comprises a pair of latches, which are apart from each other in accordance with the width of the holder, to which the locks of the holder are locked; and a guide projection protruding from the main board attaching surface between the pair of latches and inserted into the elongated guide hole of the holder to guide the holder slidably.

According to another aspect of the invention, each latch is formed by bending the main board attaching surface upwardly to accommodate the edge of the main body, and the pairs of latches are plurally arranged at regular intervals along a lengthwise direction of the holder.

According to another aspect of the invention, the guiding projection comprises an extension protruding from the main board attaching surface, and an insert extended from the extension and having a larger diameter than that of the extension, and the elongated guide hole includes an insertion section having a larger width than that of the insert, and a moving section communicated with the insertion section and having a smaller width than that of the insert.

According to another aspect of the invention, the computer further comprises a combining unit to attach the main board to the main board attaching surface, wherein the combining unit includes at least one boss hole formed on the main board; and at least one boss protruding from the main board attaching surface and inserted into the boss hole.

According to another aspect of the invention, the boss includes a column protruding from the main board attaching surface; a head having a diameter larger than that of the column; and a recession circumferentially formed between the column and the head, and the boss hole includes a broad section having a larger width than the diameter of the head of the boss; and a narrow section having a smaller width than the diameter of the broad section and communicated with the broad section.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
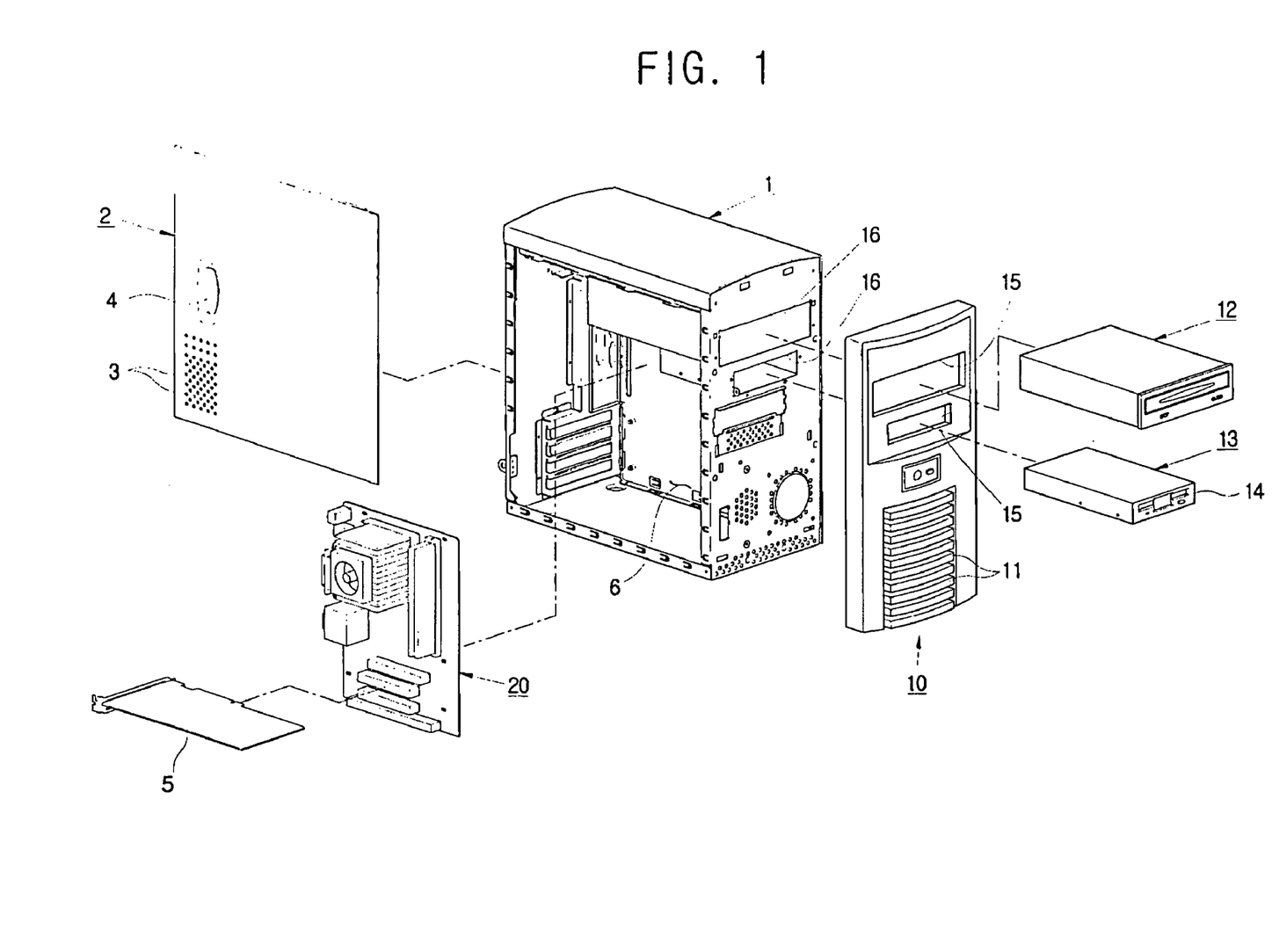
FIG. 1 is an exploded perspective view of a computer according to the present invention.

As shown in FIG. 1, a computer according to the present invention comprises a box shaped casing 1 formed with at least one opening side, a casing cover 2 to cover the opening of the casing 1, and a front bezel 10 combined to the front of the casing 1.

A main board attaching surface 6 to which a main board 20 is attached is provided inside the casing 1, wherein the main board 20 is mounted with a CPU, a RAM, and an expansion card 5 such as a graphic card, a sound card, etc.

The casing cover 2 is formed with a plurality of air through holes 3 through which heat from components provided in the casing 1 is dissipated. Above the air through holes 3, the casing cover 2 is formed with a grip groove 4 allowing a user to easily grip the casing cover 2 when the user combines the casing cover 2 to or separates it from the casing 1.

A plurality of air inlet slots 11, through which air flows into the casing 1, are formed in a lower part of the front bezel 10. Above the air inlet slots 11, the front bezel 10 is formed with a plurality of exposing holes 15 through which peripherals 12 such as a CD-ROM drive 12, a floppy disk drive 13, etc., are exposed to the outside. Here, the exposing holes 15 are disposed corresponding to through holes 16 formed in the front of the casing 1, respectively.

The main board 20 is slidably attached onto the main board attaching surface 6 with a combining unit, being supported by a main board supporting unit.

Figure 2:
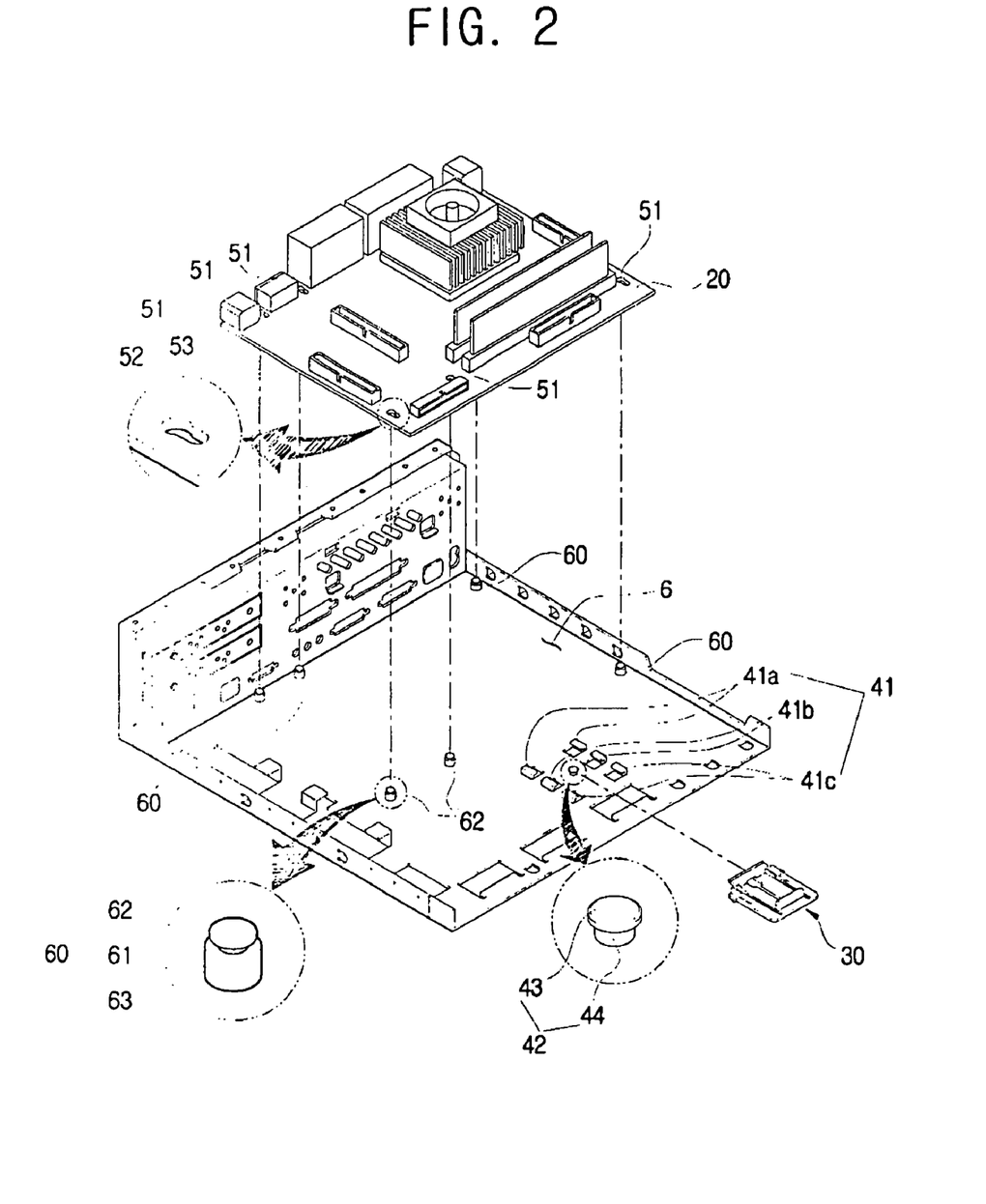
FIG. 2 is an exploded perspective view of a main board attaching surface of the computer in FIG. 1.

As illustrated in FIG. 2, the combining unit includes a plurality of boss holes 51 formed on the main board 20, and a plurality of bosses 60, which protrude from the main board attaching surface 6 and which are fit to be inserted into the boss holes 51.

Each boss 60 includes a column 61 standing on the main board attaching surface 6, a head 62 incorporated with the column 61 and having a diameter larger than that of the column 61, and a recession 63, which is circumferentially formed between the column 61 and the head 62.

The boss hole 51 includes a broad section 52 having a width larger than the diameter of the head 62 of the boss 60, and a narrow section 53 having a width smaller than the diameter of the broad section 52, which communicates with the broad section 52. Therefore, at an initial position in which the main board 20 is first attached to the main board attaching surface 6, the head 62 of the boss 60 passes through the broad section 52. Then, after the head 62 has passed through the broad section 52, the main board 20 is slid in a direction of an arrow "A" shown in FIG. 4, so that the recession 63 of the boss 60 is held by the narrow section 53 as shown in FIG. 5. That is, the main board 20, illustrated in FIG. 5, is in a holding position at which the recession 63 is held by the narrow section 53.

The main board supporting unit includes a holder 30 to prevent the main board 20 from moving, and a guide to guide the holder 30.

The holder 30 is slidably combined to the main board attaching surface 6, and prevents the main board 20 from moving from the holding position.

Figure 3:
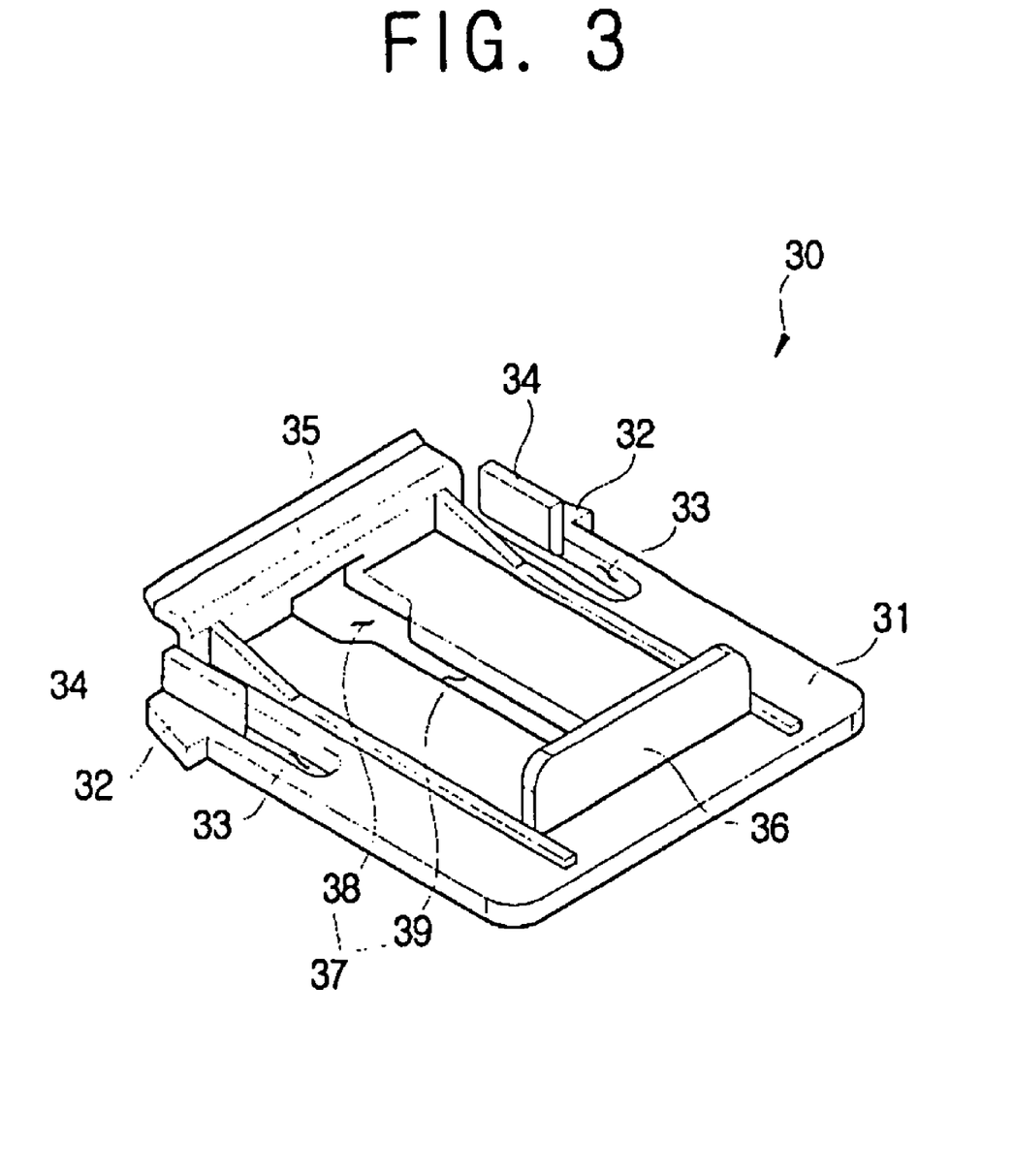
FIG. 3 is a perspective view of a holder in FIG. 2.

As shown in FIG. 3, the holder 30 comprises a main body 31 having a pair of locks 32 respectively formed in opposite sides thereof to be locked to a latch 41 of the guide (to be described later), a pair of first grips 34 upwardly extended from the respective locks 32 and allowing the locks 32 to move toward and away from each other, a holding part 35 provided at an end of the main body 31 between the first grips 34 to hold one edge of the main board 20, a second grip 36 protruding from an upper surface of the main body 31 at a position opposite to the holding part 35 and pushing the main body 31, and an elongated guide hole 37 formed on the main body 31 between the holding part 35 and the second grip 36.

A cutting part 33, which allows the first grips 34 to elastically move toward and away from each other is formed in the main body 31 adjacent to the first grip 34, thereby allowing the locks 32 to elastically move toward and away from each other.

The guide is formed on the main board attaching surface 6 at a position spaced from the main board 20, and is employed to slidably guide the holder 30.

The guide comprises the pair of latches 41 being apart from each other corresponding to the width of the holder 30 and to which the locks 32 of the holder 30 are locked, and a guiding projection 42. The guiding projection 42 protrudes from the main board attaching surface 6 between the latches 41 and is inserted into the elongated guide hole 37 of the holder 30 to slidably guide the holder 30.

Each latch 41 is formed by cutting and bending the main board attaching surface 6 upwardly to accommodate the edges of the main body 31. The pairs of latches 41 being apart from each other corresponding to the width of the holder 30 are plurally arranged at regular intervals along a lengthwise direction of the holder 30. In this embodiment, three pairs of latches will be referred to as first latches 41a, second latches 41b and third latches 41c in sequence according to their proximity to the main board 20. Thus, the pair of locks 32 are selectively locked to one of the pairs of latches 41a, 41b and 41c according to the size of the main board 20 which is to be attached to the main board attaching surface 20.

The guiding projection 42 comprises an extension 44, as illustrated in FIG. 2, protruding from the main board attaching surface 6, and an insert 43, which is extended from the extension 44, having a diameter larger than that of the extension 44, so that the guiding projection 42 is inserted in the elongated guide hole 37 of the holder 30 and is employed in slidably guiding the holder 30.

Further, the elongated guide hole 37 includes an insertion section 38 having a larger width than the diameter of the insert 43, and a moving section 39, which is communicated with the insert 38, having a smaller width than that of the insert 43, so that the guiding projection 42 can slide through the elongated guide hole 37, thereby slidably guiding the holder 30.

In the computer according to the present invention, a process of attaching the main board 20 onto the main board attaching surface 6 will be described hereinbelow.

First, the main board 20 is placed on the main board attaching surface 6, with the heads 62 of the bosses 60 passing through the boss holes 51 of the main board 20, respectively. At this time, the main board 20 may move freely where the heads 62 of the bosses 60 have been passed through the broad section 52, and the main board 20 is in the initial position (refer to FIG. 4).

Figure 4:
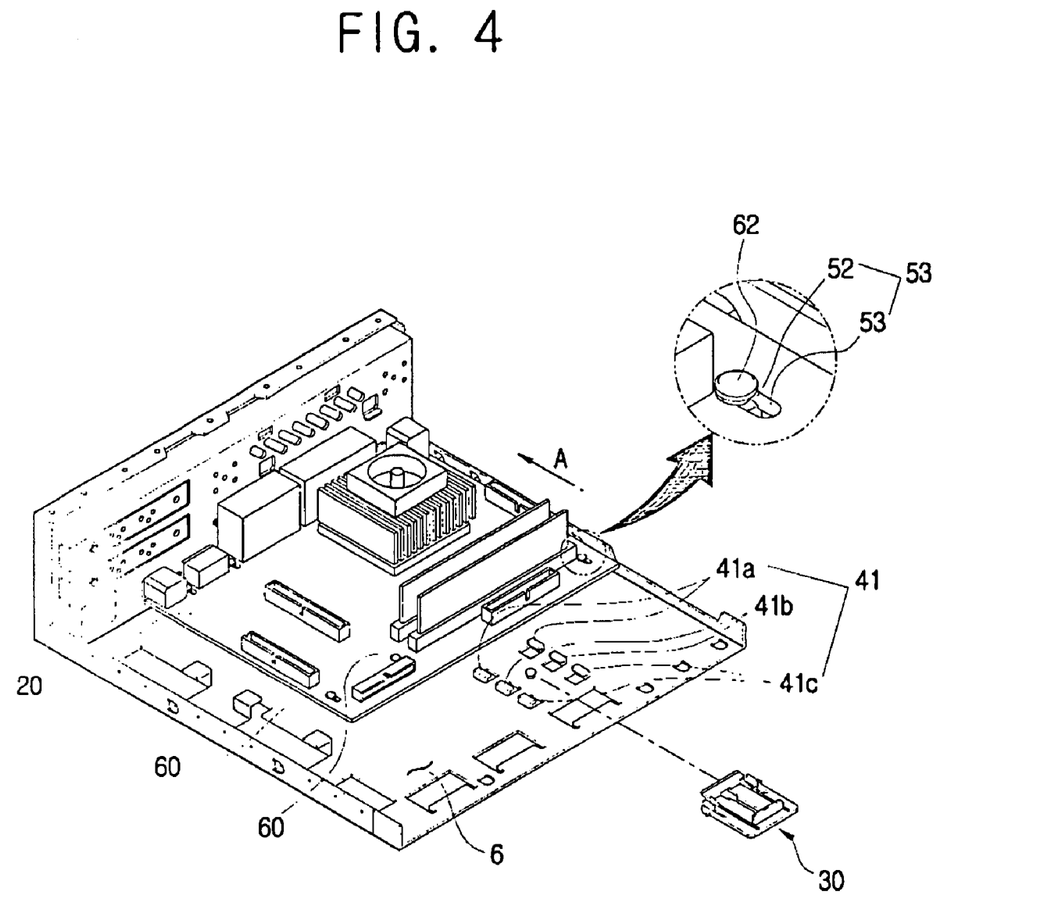
FIGS. 4 and 5 illustrate that a main board is movable on the main board attaching surface of FIG. 2.
Figure 5:
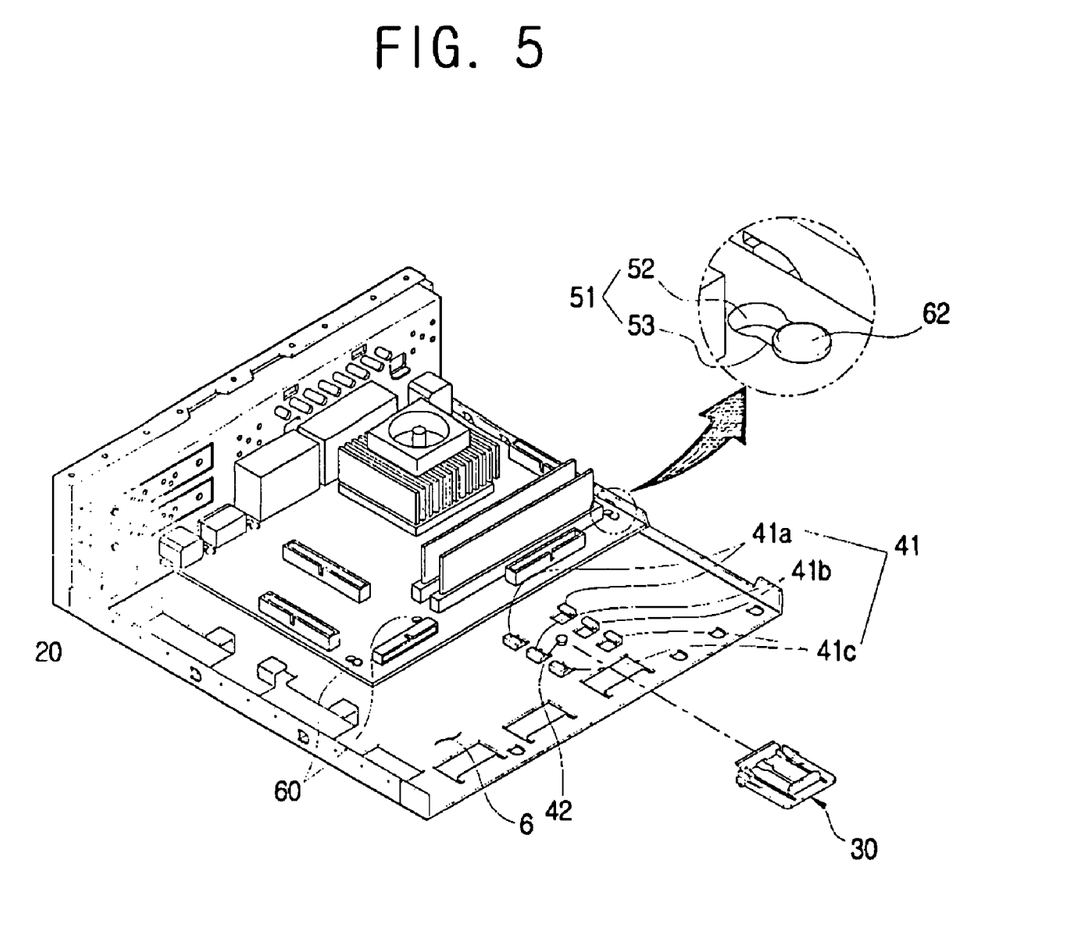

Then, as shown in FIG. 4, a user slides the main board 20 in the direction of the arrow "A" from the initial position, so that the head 62 of the boss 60 moves to the narrow section 53 of the boss hole 51 and the recession 63 of the boss 60 is held by the narrow section 53. At this time, the main board 20 is held on the main board attaching surface 6, and the main board 20 is in the holding position (refer to FIG. 5).

Figure 6:
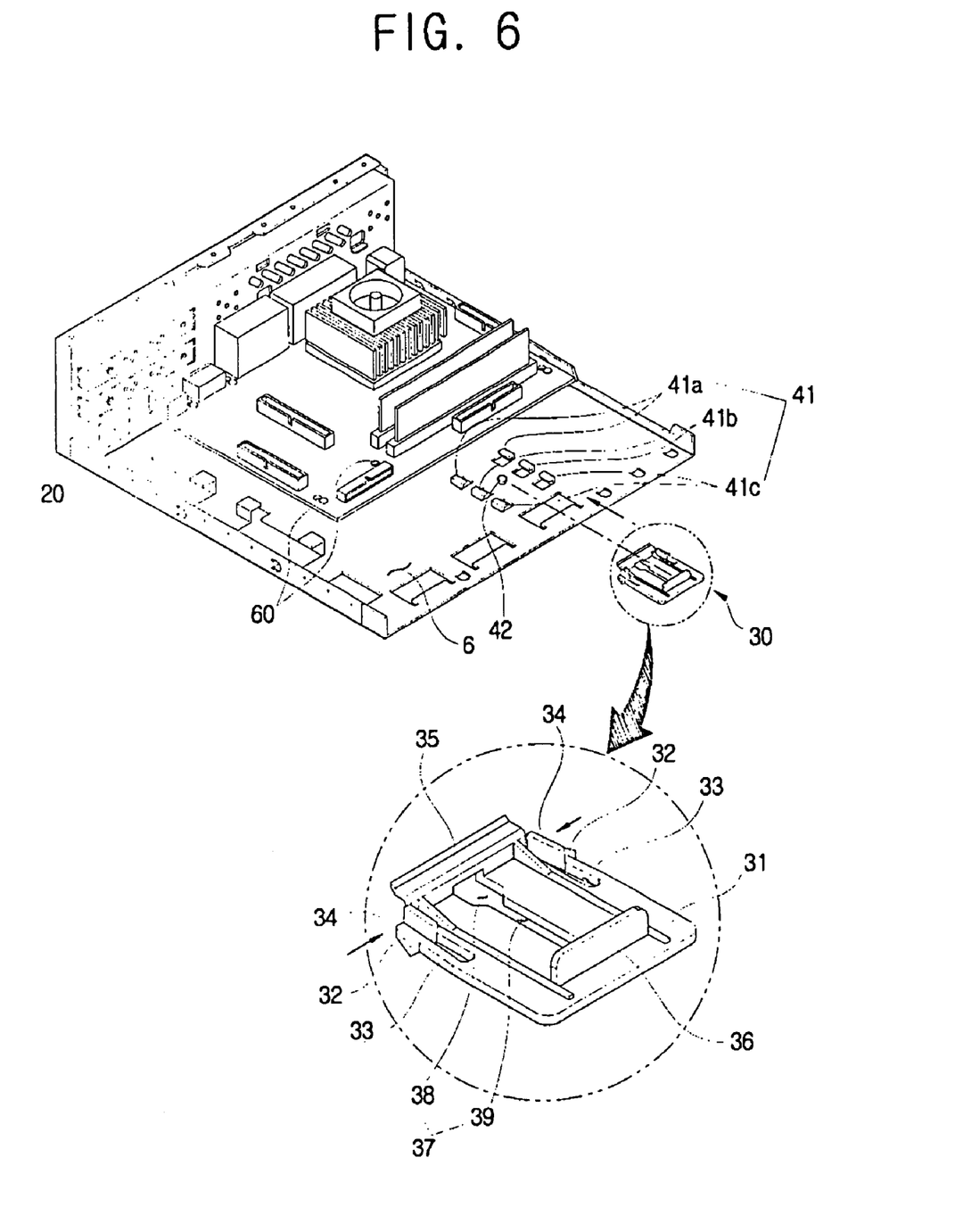
FIGS. 6 through 8 illustrate a process of combining the holder of FIG. 3 to the main board attaching surface of FIG. 5 in sequence.
Figure 7:
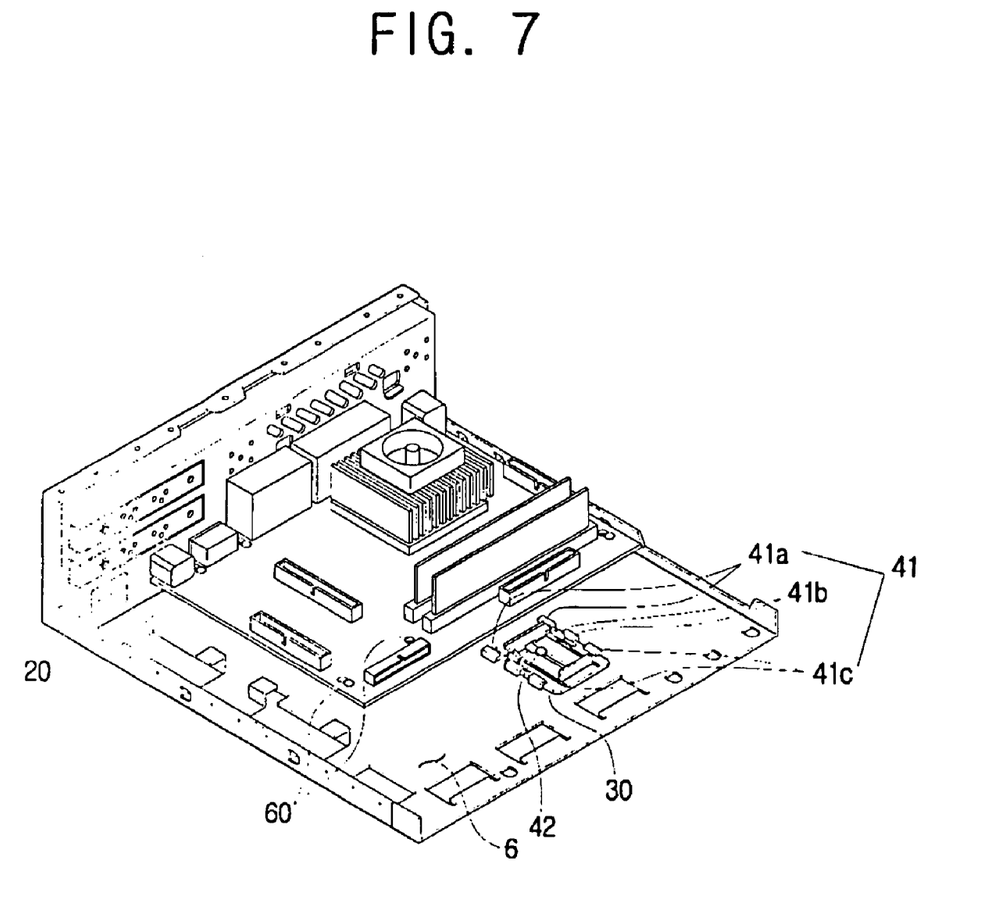
Figure 8:
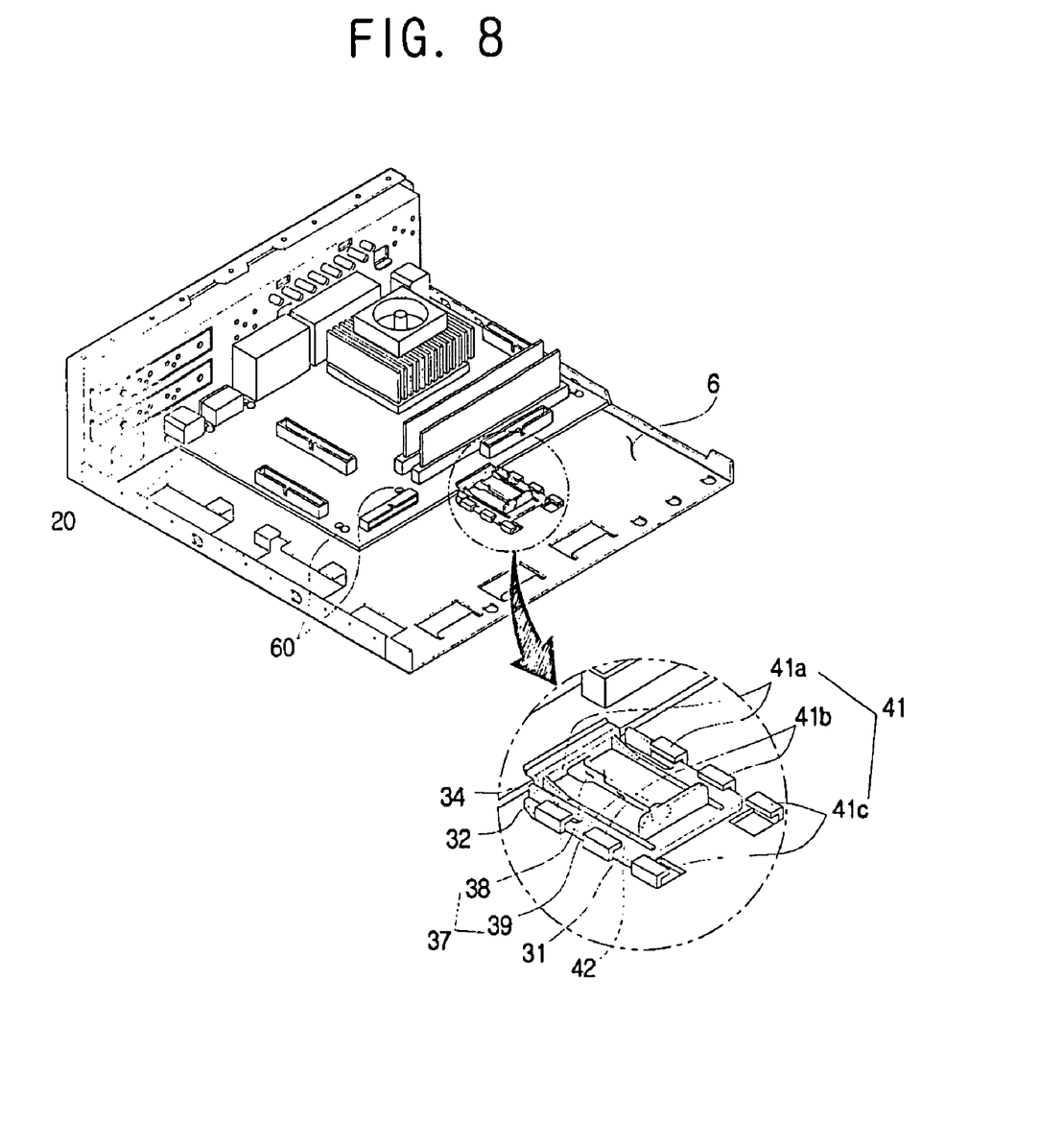

Then, as shown in FIG. 6, a user presses the pair of first grips 34 of the holder 30 to be closer together, so that the pair of locks 32 may move closer together due to force applied by the cutting part 33. There, the holder 30 is inserted between the pair of third latches 41c formed on the main board attaching surface 6, with the insert 43 of the guiding projection 42 passing through the insertion section 38 of the elongated guide hole 37. Then, a user pushes the holder 30 in the same direction that the main board 20 slides (the arrow direction "A" of FIG. 4). There, as shown in FIG. 7, the insert 43, passed through the insertion section 38 of the elongated guide hole 37, moves to the moving section 39 until the locks 32 of the holder 30 reach the first latch 41a, passing through the third and second latches 41c and 41b in sequence. When the locks 32 reach the first latch 41a, a user releases the first grips 34, so that the pair of locks 32 elastically returns to their original state and are respectively locked to the pair of first latches 41a, as shown in FIG. 8. Thus, the holder 30 is combined to the main board attaching surface 6. There, the holding part 35 holds one edge of the main board 20, so that the main board 20 is firmly and immovably attached to the main board attaching surface 6.

In contrast, the main board 20 may be detached from the main board attaching surface 6 in the inverse order of the foregoing attaching process. First, a user presses the pair of first grips 34 of the holder 30 to be closer together, thereby releasing the locks 32 from the first latches 41a. In this state, the holder 30 is drawn in the opposite direction of the arrow "A" until the insert 43 reaches the insertion section 38 of the elongated guide hole 37, and then the holder 30 is separated from the main board attaching surface 6. When the holder 30, preventing the main board 20 from moving, is removed, the main board 20 can be slid out of position. Therefore, when the head 62 of the boss 60 reaches the broad section 52 of the boss hole 51 by sliding the main board 20 in the opposite direction of the arrow "A", the main board 20 may be detached from the main board attaching surface 6.

Figure 9:
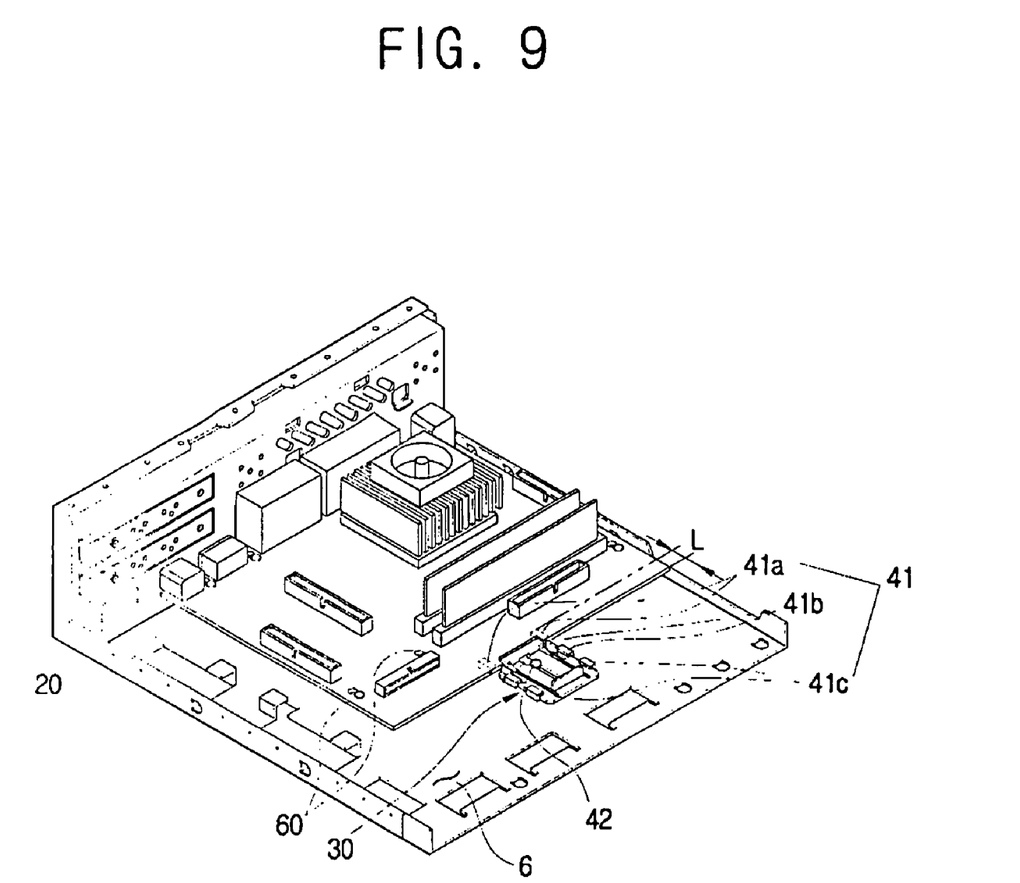
FIG. 9 illustrates that the holder supports a main board larger than that of FIG. 5.

On the other hand, as shown in FIG. 9, in the case of a main board 20a which is larger than the main board 20 of FIG. 8 in terms of a length "L", as illustrated in FIG. 9, the main board 20a may be firmly attached onto the main board attaching surface 6 by the foregoing attaching process, with the locks 32 of the holder 30 being locked to the second latches 41b.

Thus, in the computer according to the present invention, the main board may be easily attached to and detached from the casing, so that, from a manufacturer's point of view, time taken to assemble the computer is reduced. Therefore the computer is improved in its productivity. Additionally, the components are protected from damage, which may occur while the main board is attached to or detached from the casing.

Further, in the computer according to the present invention, the pairs of latches are arranged at regular intervals along the lengthwise direction, so that the locks of the holder to hold the main board can be selectively locked to the latches according to the size of the main board. Therefore, various sizes of the main board can be firmly attached to the casing.

As described above, the present invention provides a computer, in which a main board is easily attached to and detached from a casing, so that time taken to assemble the computer is reduced and therefore the computer is improved in its productivity, components are protected from damage which may occur while the main board is attached to or detached from the casing, and various sizes of the main board can be firmly attached to the casing.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A computer, including a casing forming an outer appearance and having a main board attaching surface to which a main board is attached, comprising:
   a main board supporting unit provided on the main board attaching surface to support the main board;
   a holder having a plurality of locks, slidably combined to the main board attaching surface, and preventing the main board from moving, the holder comprising:
      a main body having the locks respectively formed in opposite sides thereof,
      a pair of first grips upwardly extended from each lock and forcing the pair of locks to move toward and away from each other, and
      a holding part provided at an end of the main body between the pair of first grips to wedge one edge of the main board between the holding part and the main board attaching surface using a downward force; and
   a guide formed on the main board attaching surface at a position spaced from the main board to guide the holder, the lock being locked to the guide.

2. The computer according to claim 1, wherein the holder further comprises:
   a second grip protruding from an upper surface of the main body at a position opposite to the holding part and pushing the main body to slide; and
   an elongated guide hole formed on the main body between the holding part and the second grip to slidably guide the holder.

3. The computer according to claim 2, wherein the guide comprises:
   a pair of latches being apart from each other, which correspond to the width of the holder and to which the locks of the holder are locked; and
   a guiding projection protruding from the main board attaching surface between the pair of latches and which is inserted into the elongated guide hole of the holder to slidably guide the holder.

4. The computer according to claim 3, wherein each latch is formed by bending the main board attaching surface upwardly to accommodate the edge of the main body, and the pairs of latches are plurally arranged at intervals along a lengthwise direction of the holder.

5. The computer according to claim 4, wherein the guiding projection comprises an extension protruding from the main board attaching surface, and an insert extended from the extension, which has a larger diameter than that of the extension, and the elongated guide hole includes an insertion section having a larger width than the diameter of the insert, and a moving section communicated with the insertion section and having a width smaller than that of the insert.

6. The computer according to claim 1, further comprising a combining unit to attach the main board to the main board attaching surface, wherein the combining unit includes:
at least one boss hole formed on the main board; and
at least one boss protruding from the main board attaching surface and inserted into the boss hole.

7. The computer according to claim 6, wherein:
the boss includes:
a column protruding from the main board attaching surface,
a head having a larger diameter than that of the column, and
a recession circumferentially formed between the column and the head, and the boss hole includes:
a broad section having a larger width than the diameter of the head of the boss, and
a narrow section, having a smaller width than the diameter of the broad section, which communicates with the broad section.

8. The computer according to claim 1, wherein the holder comprises a main body having the locks respectively formed in opposite sides thereof.

9. The computer according to claim 8, further comprising a pair of first grips upwardly extended from each lock, which allows the pair of locks to move toward and away from each other.

10. The computer according to claim 1, further comprising a second grip, which protrudes from an upper surface of the main body at a position which is opposite to the holding part, pushing the main body to slide.

11. The computer according to claim 2, wherein the guide comprises a pair of latches, positioned apart from each other, which correspond to the width of the holder and to which the locks of the holder are locked.

12. The computer according to claim 4, wherein the guiding projection comprises an extension protruding from the main board attaching surface, and an insert extended from the extension and having a diameter larger than that of the extension.

13. The computer according to claim 6, wherein the boss comprises:
a column protruding from the main board attaching surface;
a head having a larger diameter than that of the column; and
a recession circumferentially formed between the column and the head.

14. The computer according to claim 6 wherein the boss hole comprises:
a broad section having a width larger than the diameter of the head of the boss; and
a narrow section, having a width smaller than the diameter of the broad section, communicating with the broad section.

15. A computer casing, having a main board attaching surface to which a main board is attached by a user, comprising:
a main board supporting unit provided on the main board attaching surface to support the main board in an initial position and in a holding position, which is achieved when the main board is slid along the main board attaching surface from the initial position;
a holder having:
a lock, to be slidably combined to the main board attaching surface by the user, to thereby prevent the main board from becoming unintentionally detached from the holding position, and
a holding part to selectively hold one edge of the main board; and
a guide, formed on the main board attaching surface at a position which is spaced from the main board, to guide the holder, until the lock is locked to the guide.

16. The computer according to claim 15, wherein the lock is plural in number and the holder comprises a main body having the locks respectively formed in opposite sides thereof.

17. The computer according to claim 16, further comprising a pair of first grips upwardly extended from each lock, which forces the pair of locks to move toward and away from each other.

18. The computer according to claim 17, wherein the holding part is provided at an end of the main body between the pair of first grips to hold one edge of the main board.

19. The computer according to claim 18, further comprising a second grip, which protrudes from an upper surface of the main body at a position which is opposite to the holding part, pushing the main body to slide.

20. The computer according to claim 19, further comprising an elongated guide hole formed on the main body between the holding part and the second first grip.

21. The computer according to claim 20, wherein the guide comprises a pair of latches, positioned apart from each other, which correspond to the width of the holder and to which the locks of the holder are locked.

22. The computer according to claim 21, wherein the guide further comprises a guiding projection protruding from the main board attaching surface between the pair of latches and inserted into the elongated guide hole of the holder to slidably guide the holder.

23. The computer according to claim 22, wherein each of the latches is formed by bending the main board attaching surface upwardly to accommodate the edge of the main body, and the pairs of latches are arranged at intervals along a lengthwise direction of the holder.

24. The computer according to claim 23, wherein the guiding projection comprises an extension protruding from the main board attaching surface, and an insert extended from the extension and having a diameter larger than that of the extension.

25. The computer according to claim 24, wherein the elongated guide hole includes an insertion section having a larger width than the diameter of the insert, and a moving section which communicates with the insertion section and has a smaller width than that of the insert.

26. The computer according to claim 15, further comprising a combining unit to attach the main board to the main board attaching surface, wherein the combining unit includes:
at least one boss hole formed on the main board; and
at least one boss protruding from the main board attaching surface and inserted into the boss hole.

27. The computer according to claim 23, wherein the boss comprises:
a column protruding from the main board attaching surface;
a head having a larger diameter than that of the column; and
a recession circumferentially formed between the column and the head.

28. The computer according to claim 26, wherein the boss hole comprises:
- a broad section having a width larger than the diameter of the head of the boss; and
- a narrow section, having a width smaller than the diameter of the broad section, communicating with the broad section.

29. A method of attaching a main board onto a main board attaching surface of a computer;
- placing the main board on the main board attaching surface in an initial position;
- sliding the main board from the initial position to a holding position; and
- locking the main board in place comprising selectively wedging the main board to the main board attaching surface.

\* \* \* \* \*